(12) United States Patent
Quis et al.

(10) Patent No.: US 6,620,876 B2
(45) Date of Patent: Sep. 16, 2003

(54) AQUEOUS MONOMER/POLYMER COMPOSITION

(75) Inventors: Peter Quis, Darmstadt (DE); Monika Rohrer, Alzenau (DE)

(73) Assignee: Roehm GmbH & Co., KG, Darmstadt (DE)

( * ) Notice: Subject to any disclaimer, the term of this patent is extended or adjusted under 35 U.S.C. 154(b) by 20 days.

(21) Appl. No.: 09/978,655

(22) Filed: Oct. 18, 2001

(65) Prior Publication Data

US 2002/0068785 A1 Jun. 6, 2002

(30) Foreign Application Priority Data

Oct. 18, 2000 (DE) .......................................... 100 51 762

(51) Int. Cl.$^7$ .................................................. C08F 2/32
(52) U.S. Cl. ....................... 524/501; 524/523; 524/525; 524/529; 525/242; 525/244; 525/263; 525/243; 525/902; 525/64
(58) Field of Search ................................ 525/242, 244, 525/263, 243, 902, 64; 524/523, 525, 529, 501

(56) References Cited

U.S. PATENT DOCUMENTS

| | | | |
|---|---|---|---|
| 4,452,941 A | 6/1984 | Kishida et al. | |
| 5,403,883 A | 4/1995 | Messner et al. | |
| 5,643,993 A | 7/1997 | Guerin | |
| 5,840,804 A | 11/1998 | Carl et al. | |
| 6,020,435 A | 2/2000 | Blankenship et al. | |
| 2002/0002259 A1 * | 1/2002 | Quis et al. | ................ 526/323.1 |

FOREIGN PATENT DOCUMENTS

| | | |
|---|---|---|
| EP | 0 409 459 | 1/1991 |
| EP | 0 534 211 | 3/1993 |
| EP | 1 061 100 | 12/2000 |
| WO | WO 96/36651 | 11/1996 |
| WO | WO 98/33831 | 8/1998 |

\* cited by examiner

*Primary Examiner*—David W. Wu
*Assistant Examiner*—Satya B Sastri
(74) *Attorney, Agent, or Firm*—Oblon, Spivak, McClelland, Maier & Neustadt, P.C.

(57) ABSTRACT

A storage stable monomer/polymer composition comprises a component A and a component B. Component A comprises an emulsion polymer formed by the polymerization of 1–99% by weight of a $C_1$–$C_{10}$ alkyl acrylate, 99–1% by weight of $C_1$–$C_{10}$ alkyl methacrylate, and 0–0.5% by weight of a first graft component, which is then swollen by a mixture of at least one ethylenically unsaturated monomer and a polymerization initiator. Component B also comprises an emulsion polymer formed by the polymerization of 1–99% by weight of $C_1$–$C_{10}$ alkyl acrylate, 99–1% by weight of $C_1$–$C_{10}$ alkyl methacrylate, and 0–0.5% by weight of a second graft component, swollen with at least one ethylenically unsaturated monomer and a polymerization activator. Curing of the monomer/polymer composition begins only after the water has evaporated from the dispersion. The aqueous monomer/polymer compositions are used as binders for road marking paints, floor coating compositions, coating materials and sealing compositions.

27 Claims, No Drawings

AQUEOUS MONOMER/POLYMER COMPOSITION

BACKGROUND OF THE INVENTION

1. Field of the Invention

The invention relates to compositions comprising at least one monomer component incorporated into an aqueous polymer dispersion by swelling the polymer component of the dispersion, and to a composition comprising initiators and activators. Following the evaporation of the aqueous phase, the monomer/polymer composition forms a film and the polymerization of the monomer component is initiated. The result is a clear, compatible film having a new polymer phase formed by the polymerization of the monomer in the existing polymer phase.

2. Discussion of the Background

Hydrophobic binders tend to emit volatile monomers, thus causing potential environmental, health, safety, and odor problems. The conventional solution to this problem is to replace a portion of the methyl methacrylate monomer component of such compositions with relatively high-boiling monomers, such as butyl methacrylate. However, the amount of butyl methacrylate cannot be raised to too high a level, because, for example, the resulting polymers would be too soft (see, for example, DE 198 26 412). In addition, substituting less volatile monomers (e.g., butyl methacrylate) for volatile monomers (e.g., methyl methacrylate) only partly solves the emission problem because low molecular weight monomers, such as methyl methacrylate, are still present, and are still emitted at measurable levels.

The object of the present invention, therefore, is to develop a monomer/polymer composition which has good mechanical properties and emits very little, if any, monomer. Moreover, the composition should be easy to handle and should possess a high level of storage stability.

SUMMARY OF THE INVENTION

Accordingly, it is an object of the present invention to provide a monomer/polymer composition comprising two components A and B, or a mixture thereof, wherein component A comprises:

a) an first emulsion polymer formed from 1–99% by weight of a $C_1$–$C_{10}$ alkyl acrylate, 99–1% by weight of $C_1$–$C_{10}$ alkyl methacrylate, and 0–0.5% by weight of a graft component chemically incorporated into the first emulsion polymer;

b) at least one first ethylenically unsaturated monomer incorporated into the first emulsion polymer; and c) a polymerization initiator dissolved in the first ethylenically unsaturated monomer;

component B comprises:

d) a second emulsion polymer formed from 1–99% by weight of $C_1$–$C_{10}$ alkyl acrylate, 99–1% by weight of $C_1$–$C_{10}$ alkyl methacrylate, and 0–0.5% by weight of a graft component incorporated chemically into the second emulsion polymer;

e) at least one second ethylenically unsaturated monomer incorporated into the second emulsion polymer; and f) a polymerization activator dissolved in the second ethylenically unsaturated monomer;

wherein the first and second emulsion polymers are swollen with, respectively, the first and second ethylenically unsaturated monomers.

DETAILED DESCRIPTION OF THE INVENTION

Component A comprises a first aqueous emulsion polymer formed from:

1. 1–99% by weight, based on the polymer, of $C_1$–$C_{10}$ alkyl methacrylates,
2. 99–1% by weight, based on the polymer, of $C_1$–$C_{10}$ alkyl acrylates,
3. 0–0.5% by weight, based on the polymer, of a first graft component, incorporated chemically in the first emulsion polymer.
4. At least one first ethylenically unsaturated monomer.

The first ethylenically unsaturated monomer of component A contains 0.1–5% by weight, based on the amount of first ethylenically unsaturated monomer, of at least one polymerization initiator, for example a peroxide. The amount of first ethylenically unsaturated monomer of component A may be from 1% by weight to 50% by weight, based on the amount of emulsion polymer.

Component B comprises a second aqueous emulsion polymer formed from:

1. 1–99% by weight, based on the polymer, of $C_1$–$C_{10}$ alkyl methacrylates,
2. 99–1% by weight, based on the polymer, of $C_1$–$C_{10}$ alkyl acrylates, the solids content of the dispersion being between 30% by weight and 60% by weight,
3. 0–0.5% by weight, based on the polymer, of a second graft component, incorporated chemically in the second emulsion polymer.
4. At least one second ethylenically unsaturated monomer.

The second monomer of component B contains 0.1–5% by weight, based on the amount of ethylenically unsaturated monomer, of at least one amine activator or at least one activator based, for example, on vanadium. The amount of second ethylenically unsaturated monomer of component B is 1–50% by weight, based on the amount of the second emulsion polymer.

The solids content of the dispersions A and B is between 30 and 60% by weight.

The $C_1$–$C_{10}$ alkyl methacrylates of which the first and second emulsion polymer are comprised may be esters of methacrylic acid, such as methyl methacrylate, ethyl methacrylate, propyl methacrylate, isopropyl methacrylate, n-butyl methacrylate, isobutyl methacrylate, tert-butyl methacrylate, pentyl methacrylate, hexyl methacrylate, heptyl methacrylate, octyl methacrylate, isooctyl methacrylate, ethylhexyl methacrylate; and also cycloalkyl methacrylates, such as cyclohexyl methacrylate or tetrahydrofurfuryl methacrylate, isobornyl methacrylate.

The $C_1$–$C_{10}$ alkyl acrylates of which the first and second emulsion polymer are comprised may be esters of acrylic acid, such as methyl acrylate, ethyl acrylate, propyl acrylate, isopropyl acrylate, n-butyl acrylate, isobutyl acrylate, tert-butyl acrylate, pentyl acrylate, hexyl acrylate, heptyl acrylate, octyl acrylate, isooctyl acrylate and ethylhexyl acrylate; and also cycloalkyl acrylates, such as cyclohexyl acrylate.

The first and second ethylenically unsaturated monomers may comprise, for example, any of the following, including mixtures thereof:

$C_1$–$C_{10}$ alkyl methacrylates, as defined above;

hydroxy esters of methacrylic acid, such as 2-hydroxyethyl methacrylate, hydroxypropyl methacrylate; and ether esters, such as 2-(2-(2-ethoxyethoxy)ethoxy)ethyl methacrylate and 2-(2-butoxyethoxy)ethyl methacrylate.

The first and second ethylenically unsaturated monomers may each comprise 1%–50%, preferably 10%–20%, based on the amount of polymer in the respective dispersions of component A and component B, and may be the same or different. The ethylenically unsaturated monomers are incorporated into the polymer dispersion by allowing the monomer to swell the polymer. By swelling the polymer, we mean that the ethylenically unsaturated monomer penetrates into the polymer particles of the dispersion, without actually dissolving the polymer particles. Thus, the ethylenically unsaturated monomer is dispersed, on a molecular level, in the polymer phase of the polymer dispersion.

The optional first and second graft component of the respective emulsion polymers may be a comonomer containing, for example, allyl groups, hydroxyl groups or mercapto groups, et cetera.

In addition, 0–5% by weight of an optional crosslinker or mixture of crosslinkers may be added to either or both of component A and component B. Such crosslinkers may include, for example, 1,4-butanediol dimethacrylate, tetraethylene glycol dimethacrylate, triethylene glycol dimethacrylate, trimethylolpropane triacrylate and trimethylolpropane trimethacrylate.

Examples of suitable peroxides for component A may include, for example, organic peroxides such as dibenzoyl peroxide and dilauroyl peroxide.

Component B may have the same or different composition as component A, except that instead of a peroxide, component B has an amine, such as N,N-dimethyl-p-toluidine, N,N-bis(2-hydroxyethyl)-p-toluidine or N,N-bis(2-hydroxypropyl)-p-toluidine, for example. The peroxide of component A and the amine of component B form a redox composition when components A and B are mixed, which may be used as a polymerization initiator. As an alternative to the above-mentioned peroxide/amine redox composition a hydroperoxide/vanadium activator polymerization initiator may be used.

Suitable hydroperoxides may include, for example, tert-butylhydroperoxide, cumene hydroperoxide, and ketone peroxides. Ketone peroxides may include, for example, methyl ethyl ketone peroxide, methyl isobutyl ketone peroxide or cyclohexanone peroxide, individually or as a mixture. Vanadium activators may include, for example, acidic vanadium phosphates in combination with coactivators, such as lactic acid.

Components A and B may have virtually unlimited storage stability and may be stored separately or as a mixture of the two components. Monomer/polymer compositions of the present invention may also be prepared by adding the activator of component B, in aqueous solution, to an initial charge of component A, or by adding the peroxide of component A, in aqueous solution, to an initial charge of component B.

Having generally described this invention, a further understanding can be obtained by reference to certain specific examples which are provided herein for purposes of illustration only, and are not intended to be limiting unless otherwise specified.

EXAMPLES

Preparation of the Monomer/Polymer Composition

A thermoplastic aqueous dispersion having a solids content of approximately 50% by weight, and a minimum film formation temperature of 5° C. (determined in accordance with DIN 53787, 1974-02 edition, Testing of Aqueous Polymer Dispersions; Determination of Minimum Film Formation Temperature and of the White Point) (e.g., Plextol B 500, produced and sold by PolymerLatex GmbH) was introduced into a stirred tank together with, for example, methyl methacrylate or butyl methacrylate, or a mixture of the two esters, and with further monomers (e.g., methacrylic or acrylic esters) if desired (weight ratio of dispersion to monomer=5 to 20). The thermoplastic polymer component of the dispersion of this initial charge was then allowed to swell with the added monomers at 20° C. for 0.5–5 h with stirring. The peroxide (1–5% by weight, based on monomer) was added as a solution in the monomer. The viscosity remained stable.

Component B was prepared in the same manner as component A except that component B contains an amine, instead of the peroxide of component A, dissolved in the monomer and then incorporated into the polymer component of the dispersion by swelling the polymer.

The two components A and B, each containing components of the initiator, may also be combined. Provided that the individual components A and B, or the mixture of the two remains an aqueous dispersion, the individual components A and B, or the mixture thereof, have virtually unlimited storage stability.

Exemplary Formulation: Road Marking Composition Having a Binder Comprising the Monomer/Polymer Composition of the Present Invention Variant A Equal parts by weight of component A and component B, as described above, were mixed, then mixed with the following additives using a disperser:

0.15–0.25 parts $TiO_2$ 0.3–0.5 parts chalk 0.01–0.05 parts wetting agent 0.01–0.05 parts defoamer 0.01–0.05 parts surface auxiliary The finished mixture was applied to concrete or asphalt using conventional application equipment and, after it formed a film, provided durable road markings.

Variant B

Instead of mixing aliquots of components A and B, the monomer/polymer composition of the present invention may be prepared by adding to twice the amount of component A of Variant A, above, an amount of activator in the form of an aqueous solution corresponding to that contained in the aliquot of component B of Variant A.

Formulations for Road Markings Materials

Example 1

=binder consisting of parts A and B:

| Part A | | Part B | |
|---|---|---|---|
| 250 g | of Plextol B500 | 250 g | of Plextol B500 |
| 12.5 g | of methyl methacrylate | 12.5 g | of methyl methacrylate |
| 2.6 g | of dibenzoyl peroxide, 50% followed by 1 day of swelling | 1.3 g | of diethylol-p-toluidine |

200 g of part A and of part B (see below) were each provided with different additives and mixed together using a disperser. Before application to the test area, the two components were mixed and diluted further with 80 g of water.

| 200 g | of part A | And | 200 g | of part B |
|---|---|---|---|---|
| 1 g | of Surfonyl CT 136 (wetting agent) | | 1 g | of Surfonyl CT 136 (wetting agent) |
| 2.5 g | of Agitan 281 (defoamer) | | 2.5 g | of Agitan 281 (defoamer) |
| 1 g | of Natrosol 250 HBR | | 1 g | of Natrosol 250 HBR |
| 75 g | of TiO$_2$ (2056) | | 75 g | of TiO$_2$ (2056) |
| 175 g | of Durcal 5 (chalk) | | 175 g | of Durcal 5 (chalk) |
| 45 g | of water | | 45 g | of water |
| 2.5 g | of Texanol (surface auxiliary) | | 2.5 g | of Texanol (surface auxiliary) |

Example 2

Binder consisting of:

500 g of Plextol B500

25 g of methyl methacrylate 2.6 g of dibenzoyl peroxide, 50%, followed by 1 day of swelling 400 g of the binder were provided with different additives (see below), and mixed with a disperser. Prior to application to the test area, the aqueous diethylol-p-toluidine solution (see below) was added.

400 g of binder 2 g of Surfonyl CT 136 (wetting agent)

5 g of Agitan 281 (defoamer)

2 g of Natrosol 250 HBR 150 g of TiO$_2$ (2056)

350 g of Durcal 5 (chalk)

92 g of water 5 g of Texanol (surface auxiliary)

Prior to application to the test area, 80 g of DI water, with 1 g of diethylol-p-toluidine dissolved therein was added.

Example 3

Binder consisting of:

500 g of Plextol B500

25 g of methyl methacrylate 1.25 g of triethylene glycol dimethacrylate 2.6 g of dibenzoyl peroxide, 50%, followed by 1 day of swelling Procedure as for preceding Example 2.

400 g of binder 2 g of Surfonyl CT 136 (wetting agent)

5 g of Agitan 281 (defoamer)

2 g of Natrosol 250 HBR 150 g of TiO$_2$ (2056)

350 g of Durcal 5 (chalk)

92 g of water 5 g of Texanol (surface auxiliary)

Prior to application to the test area:

80 g of DI water, with 1 g of diethylol-p-toluidine dissolved therein was added.

Comparative Example

The binder of the comparative example consists only of Plextol B500, the base dispersion. Using a disperser, the additives described below were mixed into the Plextol B500.

400 g of Plextol B500 (binder, comparative example)

2 g of Surfonyl CT 136 (wetting agent)

5 g of Agitan 281 (defoamer)

2 g of Natrosol 250 HBR 150 g of TiO$_2$ (2056)

350 g of Durcal 5 (chalk)

50 g of water 5 g of Texanol (surface auxiliary)

The composition of the polymer component of the dispersion Plextol B500 is 69.2% ethyl acrylate, 29.6% methyl methacrylate and 1.2% methacrylic acid Test results

| Time | Example 1 | Example 2 | Comparative Example |
|---|---|---|---|
| t = 0 | | | |
| t = 21 d | no cracks, white | | grey |
| t = 40 d | no cracks, white | slightly grey/white | dark grey |
| t = 62 d | no cracks, white | slightly grey/white | dark grey, holes |

The test results demonstrate that the greying tendency and the formation of holes is markedly lower for formulations according to the present invention than for the comparative formulations.

The composition of the present invention may be used as a binder for coating materials and road markings. The composition of the present invention may also provide coatings which have a greatly reduced soiling tendency. The compositions of the present invention may also be used as heat-sealing compositions for coating aluminum foils whose function is to seal, for example, yogurt cartons made of polystyrene or polyethylene or polypropylene, or medicament blister packs.

In order to accelerate the drying of the dispersion, it is possible if desired to use an emulsifier of the type described in EP 409 459 (i.e., an amine containing polymer combined with a volatile amine such as NH$_3$), herein incorporated by reference in its entirety. If the NH$_3$ evaporates, the emulsifier loses its activity, the dispersion becomes unstable, the particles coalesce and form a film, and the monomer/peroxide activator composition, incorporated by swelling the polymer, cures.

The priority document of the present application, German application 100 51 762.5, filed Oct. 18, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. A monomer/polymer composition, comprising:
   a component A; and
   a component B;
   wherein component A comprises:
   a) an first emulsion polymer prepared by polymerizing 1–99% by weight of a $C_1$–$C_{10}$ alkyl acrylate, 99–1% by weight of $C_1$–$C_{10}$ alkyl methacrylate, 0–0.5% by weight of a first graft component;
   b) at least one first ethylenically unsaturated monomer incorporated into the first emulsion polymer; and
   c) a polymerization initiator dissolved in the first ethylenically unsaturated monomer; and
   wherein component B comprises:
   d) a second emulsion polymer prepared by polymerizing 1–99% by weight of $C_1$–$C_{10}$ alkyl acrylate, 99–1% by weight of $C_1$–$C_{10}$ alkyl methacrylate, 0–0.5% by weight of a second graft component;
   e) at least one second ethylenically unsaturated monomers incorporated into the second emulsion polymer; and
   f) a polymerization activator dissolved in the second ethylenically unsaturated monomer;
   wherein the first and second emulsion polymers are swollen with, respectively, the first and second ethylenically unsaturated monomers; and
   wherein component A and component B are separated in an aqueous dispersion.

2. The monomer/polymer composition of claim 1, wherein the amount of the first ethylenically unsaturated monomer is 1 to 50% by weight, based on the weight of the first emulsion polymer.

3. The monomer/polymer composition of claim 1, wherein the amount of the first ethylenically unsaturated monomer is 10 to 20% by weight, based on the weight of the first emulsion polymer.

4. The monomer/polymer composition of claim 1, wherein the amount of the second ethylenically unsaturated monomer is 1 to 50% by weight, based on the weight of the second emulsion polymer.

5. The monomer/polymer composition of claim 1, wherein the amount of the second ethylenically unsaturated monomer is 10 to 20% by weight, based on the weight of the second emulsion polymer.

6. The monomer/polymer composition of claim 1, wherein the amount of polymerization initiator is 0.1 to 5% by weight, based on the amount of the first ethylenically unsaturated monomer.

7. The monomer/polymer composition of claim 1, wherein the amount of the polymerization activator is 0.1 to 5% by weight, based on the weight of the second ethylenically unsaturated monomer.

8. The monomer/polymer composition of claim 1, wherein the polymerization activator comprises at least one tertiary arylaliphatic amine.

9. The monomer/polymer composition of claim 1, wherein the polymerization activator comprises a compound selected from the group consisting of dimethyl-p-toluidine, diethylol-p-toluidine, dipropyl-p-toluidine, and the combination of a vanadium phosphate and lactic acid.

10. The monomer/polymer composition of claim 1, wherein the polymerization initiator comprises at least one diacylperoxide.

11. The monomer/polymer composition of claim 1, wherein the polymerization initiator comprises a peroxide selected from the group consisting of dibenzoyl peroxide, dilauroyl peroxide, a hydroperoxide, and a ketone peroxide.

12. The monomer/polymer composition of claim 1, wherein the first emulsion polymer and the second emulsion polymer are different.

13. The monomer/polymer composition of claim 1, wherein the first ethylenically unsaturated monomer and the second ethylenically unsaturated monomer are different.

14. The monomer/polymer composition of claim 13, wherein the first emulsion polymer and the second emulsion polymer are different.

15. The monomer/polymer composition of claim 1, further comprising a crosslinker or mixture of crosslinkers.

16. A coating composition comprising the monomer/polymer composition of claim 1.

17. The coating composition of claim 16, wherein the coating composition is selected from the group consisting of a road marking composition and a floor coating.

18. A binder for a coating composition comprising the monomer/polymer composition of claim 1.

19. A binder for a road marking composition comprising the monomer/polymer composition of claim 1.

20. A heat-sealing composition comprising the monomer/polymer composition of claim 1.

21. A method for preparing the monomer/polymer composition of claim 1 comprising:
   preparing a first emulsion polymer by polymerizing from 1–99% by weight of a $C_1$–$C_{10}$ alkyl acrylate, 99–1% by weight of $C_1$–$C_{10}$ alkyl methacrylate, and 0–0.5% by weight of a graft component;
   preparing a second emulsion polymer by polymerizing 1–99% by weight of a $C_1$–$C_{10}$ alkyl acrylate, 99–1% by weight of $C_1$–$C_{10}$ alkyl methacrylate, and 0–0.5% by weight of a graft component;
   mixing a polymerization initiator with at least one first ethylenically unsaturated monomer;
   mixing a polymerization activator with at least one second ethylenically unsaturated monomer;
   contacting the first emulsion polymer with the first ethylenically unsaturated monomer, thereby swelling the first emulsion polymer with the first ethylenically unsaturated monomer;
   contacting the second emulsion polymer with the second ethylenically unsaturated monomer, thereby swelling the second emulsion polymer with the second ethylenically unsaturated monomer; and
   mixing the first emulsion polymer swollen with the first ethylenically unsaturated monomer and polymerization initiator and the second emulsion polymer swollen with the second ethylenically unsaturated monomer and polymerization activator.

22. A method for preparing a monomer/polymer composition, comprising:

preparing a emulsion polymer formed from 1–99% by weight of a $C_1$–$C_{10}$ alkyl acrylate, 99–1% by weight of $C_1$–$C_{10}$ alkyl methacrylate, and 0–0.5% by weight of a graft component;

mixing a polymerization initiator and at least one ethylenically unsaturated monomer;

contacting the emulsion polymer with the mixture of polymerization initiator and at least one ethylenically unsaturated monomer, thereby swelling the emulsion polymer with the ethylenically unsaturated monomer; and adding an aqueous solution of a polymerization activator.

23. A method for preparing a monomer/polymer composition, comprising:

preparing a emulsion polymer formed from 1–99% by weight of a $C_1$–$C_{10}$ alkyl acrylate, 99–1% by weight of $C_1$–$C_{10}$ alkyl methacrylate, and 0–0.5% by weight of a graft component;

mixing a polymerization activator and at least one ethylenically unsaturated monomer;

contacting the emulsion polymer with the mixture of polymerization activator and at least one ethylenically unsaturated monomer, thereby swelling the emulsion polymer with the ethylenically unsaturated monomer; and adding an aqueous solution of a polymerization initiator.

24. The monomer/polymer composition of claim 1, wherein the first emulsion polymer and the second emulsion polymer are the same.

25. The monomer/polymer composition of claim 1, wherein the first ethylenically unsaturated monomer and the second ethylenically unsaturated monomer are the same.

26. The monomer/polymer composition of claim 13, wherein the first emulsion polymer and the second emulsion polymer are the same.

27. A monomer/polymer composition, comprising:

a component A; and a component B;

wherein component A comprises:

a) an first emulsion polymer prepared by polymerizing 1–99% by weight of a $C_1$–$C_{10}$ alkyl acrylate, 99–1% by weight of $C_1$–$C_{10}$ alkyl methacrylate, 0–0.5% by weight of a first graft component;

b) at least one first ethylenically unsaturated monomer incorporated into the first emulsion polymer; and c) a polymerization initiator dissolved in the first ethylenically unsaturated monomer; and wherein component B comprises:

d) a second emulsion polymer prepared by polymerizing 1–99% by weight of $C_1$–$C_{10}$ alkyl acrylate, 99–1% by weight of $C_1$–$C_{10}$ alkyl methacrylate, 0–0.5% by weight of a second graft component;

e) at least one second ethylenically unsaturated monomers incorporated into the second emulsion polymer; and f) a polymerization activator dissolved in the second ethylenically unsaturated monomer;

wherein the first and second emulsion polymers are swollen with, respectively, the first and second ethylenically unsaturated monomers; and wherein component A and component B are kept as individual components.

* * * * *